United States Patent
Madaiah

(10) Patent No.: US 9,906,925 B2
(45) Date of Patent: Feb. 27, 2018

(54) METHOD AND SYSTEM FOR EXCHANGING CONTENT AMONG COMMUNICATION ENTITIES OVER COMMUNICATION NETWORK

(75) Inventor: Vinod Kumar Madaiah, Bangalore (IN)

(73) Assignee: Vinod Kumar Madaiah, Bangalore, Karnataka (IN)

( * ) Notice: Subject to any disclaimer, the term of this patent is extended or adjusted under 35 U.S.C. 154(b) by 454 days.

(21) Appl. No.: 14/119,894

(22) PCT Filed: May 24, 2012

(86) PCT No.: PCT/IN2012/000365
§ 371 (c)(1),
(2), (4) Date: Nov. 25, 2013

(87) PCT Pub. No.: WO2013/008248
PCT Pub. Date: Jan. 17, 2013

(65) Prior Publication Data
US 2014/0087699 A1    Mar. 27, 2014

(30) Foreign Application Priority Data

May 25, 2011 (IN) .......................... 1767/CHE/2011

(51) Int. Cl.
*H04W 4/12* (2009.01)
*H04M 3/42* (2006.01)
*H04M 1/725* (2006.01)

(52) U.S. Cl.
CPC .......... *H04W 4/12* (2013.01); *H04M 1/72552* (2013.01); *H04M 3/42382* (2013.01); *H04M 2203/652* (2013.01)

(58) Field of Classification Search
CPC ....... H04M 3/42382; H04M 2203/652; H04M 1/72552; H04M 2203/651; H04M 3/42051; H04W 4/12; H04W 4/14
See application file for complete search history.

(56) References Cited

U.S. PATENT DOCUMENTS 6,430,407 B1 * 8/2002 Turtiainen ............. G06Q 20/32
                                                    380/33
2007/0042710 A1 * 2/2007 Mahini ............. H04M 1/72547
                                                   455/3.03

(Continued)

FOREIGN PATENT DOCUMENTS

WO    WO 2010092220 A1 *  8/2010 ........... H04L 12/583

*Primary Examiner* — Thai Vu
(74) *Attorney, Agent, or Firm* — Prakash Nama; Global IP Services, PLLC

(57) ABSTRACT

A method for exchanging content among communication entities over a communication network includes: checking for a trigger command along with the saved content in a memory of a first entity (510), identifying at least one second entity with which the content has to be exchanged (520), enabling a handshake message from the first entity, upon identifying the trigger command, to the second entity ensuring about the appropriate decoding block (530), converting the saved content of the first entity into symbols until a termination character is encountered (540), wherein the converted symbols are sent as deliberately terminated call(s) through a set of permissible unique identifier(s) to the second entity and translating one or more intervals of the duration of the call of the deliberately terminated calls (one Subscriber Identity Module (SIM)) or the unique numbers (more than one SIM) into unique symbols at the second entity to form a message (550).

12 Claims, 5 Drawing Sheets

(56) References Cited

U.S. PATENT DOCUMENTS

| | | | | |
|---|---|---|---|---|
| 2008/0102862 | A1* | 5/2008 | Veeraraghavan | H04W 4/14 455/466 |
| 2009/0305737 | A1* | 12/2009 | Bae | H04W 4/20 455/552.1 |
| 2010/0223314 | A1* | 9/2010 | Gadel | G11B 27/034 709/200 |
| 2012/0071179 | A1* | 3/2012 | Gonzalez Escribano | H04L 12/583 455/466 |

* cited by examiner

METHOD AND SYSTEM FOR EXCHANGING CONTENT AMONG COMMUNICATION ENTITIES OVER COMMUNICATION NETWORK

FIELD OF THE INVENTION

The present invention relates to telecommunication. More particularly, the present invention relates to a method and system of exchanging content between at least two communication entities over a communication network.

BACKGROUND OF THE INVENTION

Text messaging, or SMS (short message services), relates to sending short (160 characters (US) or fewer, including spaces) alphanumeric messages (and in some implementations can include any 8-bit binary represented characters.) It is available on most mobile phones, some personal digital assistants and computers (typically via internet sites providing SMS services). The most common application of SMS is person-to-person messaging, but text messages can also be used to interact with automated systems, such as ordering products and services for mobile phones, participating in contests, receiving news alerts, receiving calendar alerts, voting in popular TV shows, receiving weather or coastal warning alerts or other warnings of impending disaster, alerting students on college campuses to conditions of which they should be made aware, etc. There are also some services available on the Internet that allow users to send text messages free of direct charge to the sender and also provide a place to receive replies to such messages or for the user to receiving initial SMS messages sent to him. Such services are also available on the internet for fee per use or subscription.

SMS has become a massive commercial industry; the mobile networks charge each other interconnect fees when connecting between different phone networks. Messages are sent to a Short Message Service Center (SMSC) which provides a "store and forward" mechanism. It attempts to send messages to the SMSC's recipients. If a recipient is not reachable, the SMSC queues the message for later retry. Same SMSCs also provide a "forward and forget" option where transmission is tried only once.

In a typical SMS communication, every SMS transmitted from one mobile device and received at the other mobile devices, each SMS has to pass through SMSC, where the function of SMSC is to store and forward the SMS to the destination. The SMSC also performs a gate keeping function of sending and receiving SMS messages to and from other networks. This function, however, is subject to control by the service provider or mobile network, where they charge for each SMS sent from one device to the other. The charges of each SMS are elevated, when connecting between different phone networks.

Thus there is a need to have a method and system to avoid the payment for exchanging content between at least two communication entities in a communication network.

SUMMARY OF THE INVENTION

An aspect of the present invention is to address at least the above-mentioned problems and/or disadvantages and to provide at least the advantages described below.

Accordingly, an aspect of the present invention is to provide a method of exchanging content among at least two communication entities over a communication network, the method comprising: checking for a trigger command along with the saved content in a memory of a first entity, identifying at least one second entity with which the content has to be exchanged, enabling a handshake message from the first entity, upon identifying the trigger command, to the second entity ensuring about the appropriate decoding block, converting the saved content of the first entity into symbols until a termination character is encountered, wherein the converted symbols are sent as deliberately terminated call/s through a set of permissible unique identifier(s) to the second entity and translating one or more intervals of the duration of the call of the deliberately terminated calls (one SIM) or the unique numbers (more than one SIM) into unique symbols at the second entity to form a message.

In accordance with another aspect of the present invention provide a system of exchanging content between at least two communication entities, the system comprising: at least one communication network, a first communication device and at least one second communication device, wherein the first and second communication device includes a free SMS controller and a memory, wherein the controller of the first and the second communication device is configured for checking for a trigger command along with the saved content in a memory of a first entity, identifying at least one second entity for which the content has to be exchanged, enabling a handshake message from the first entity, upon identifying the trigger command along with the saved content, to the second entity ensuring about the appropriate decoding block, converting the saved content of the first entity into symbols, wherein the converted symbols are sent as deliberately terminated call/s through a permissible unique identifier to the second entity and translating one or more intervals of the duration of the call of the deliberately terminated calls (one SIM) or the unique numbers (more than one SIM) into unique symbols at the second entity to form a message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE INVENTION

The above and other aspects, features, and advantages of certain exemplary embodiments of the present invention will be more apparent from the following description taken in conjunction with the accompanying drawings in which.

Figure 1:
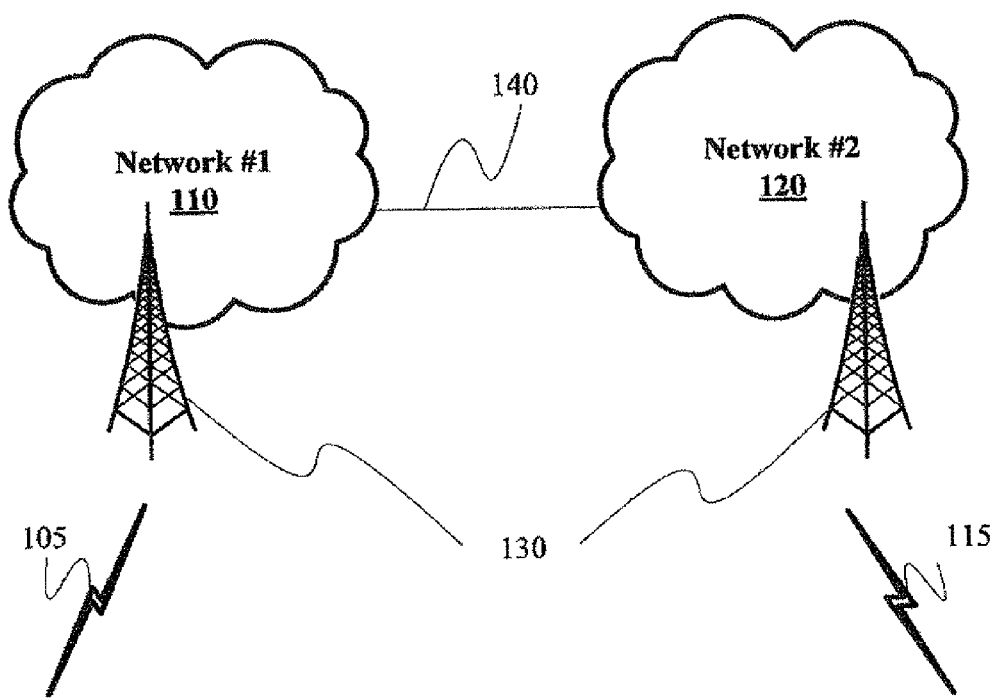
FIG. 1 is a schematic diagram illustrating a typical communication system.

Persons skilled in the art will appreciate that elements in the figures are illustrated for simplicity and clarity and may have not been drawn to scale. For example, the dimensions of some of the elements in the figure may be exaggerated

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Referring now to FIG. 1, there is illustrated a typical communication system in which the principles of this invention may be incorporated. Accordingly, the communication system 100 includes a first and a second network 110 and 120, a link 140 connecting the first and the second network 110 and 120, a first and second user 102 and 104, a first and second wireless link 105 and 115 and an antenna tower 130. Preferably, the communication system 100 is compatible with presently known, third generation (3G) wireless systems and corresponding standards. Alternatively, the communication system 100 may also be compatible with future high-speed wireless systems and corresponding standards (e.g., fixed or mobile).

According to various aspects, the first user 102, and/or the second user 104 may comprise a wireless communication device. For example, the first and/or second user may be or may include, for example, a telephone, a mobile phone, a cellular phone, a handheld device, a computing device, a computer, a mobile computer, a portable computer, a laptop computer, a notebook computer, a tablet computer, a network of multiple inter-connected devices, a handheld computer, a handheld device, a PDA device, a handheld PDA device, a vehicular device, a non-vehicular device, a mobile or portable device, or the like. According to some aspects, the first user 102, and/or the second user 104, may comprise a communication device connectable to one of the other devices/network via a wired connection.

The first and second user 102 and 104 uses the communication networks 110 and 120 for communication through an antenna 130 via wireless links 105 and 115. For example, the first and second network may be or may include, for example, a PSTN, a wired or wireless router, a wired or wireless modem, a wired or wireless network a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), One way and/or two-way radio communication systems, cellular radiotelephone communication systems, or the like Types of WLAN and/or WMAN communication systems intended to be within the scope of the present invention.

In some demonstrative embodiments, the first and second user may include a controller, a receiver, and/or a transmitter (Not shown in figure). For example, transmitter may transmit via antenna wireless RF signals, blocks, frames, transmission streams, packets, messages and/or data, e.g., to second user via the first and second communication network, and/or receiver may receive via antenna wireless RF signals, blocks, frames, transmission streams, packets, messages and/or data, from the first user through first and second communication network. Transmitter may include, for example, any suitable RF transmitter, and/or receiver may include any suitable RF receiver. Optionally, transmitter and receiver may be implemented using a transceiver, a transmitter-receiver, or other suitable component. In some embodiments, controller, transmitter and/or receiver may be implemented as part of a Medium Access Control (MAC) layer and/or any other suitable communication layer or configuration.

Figure 2:
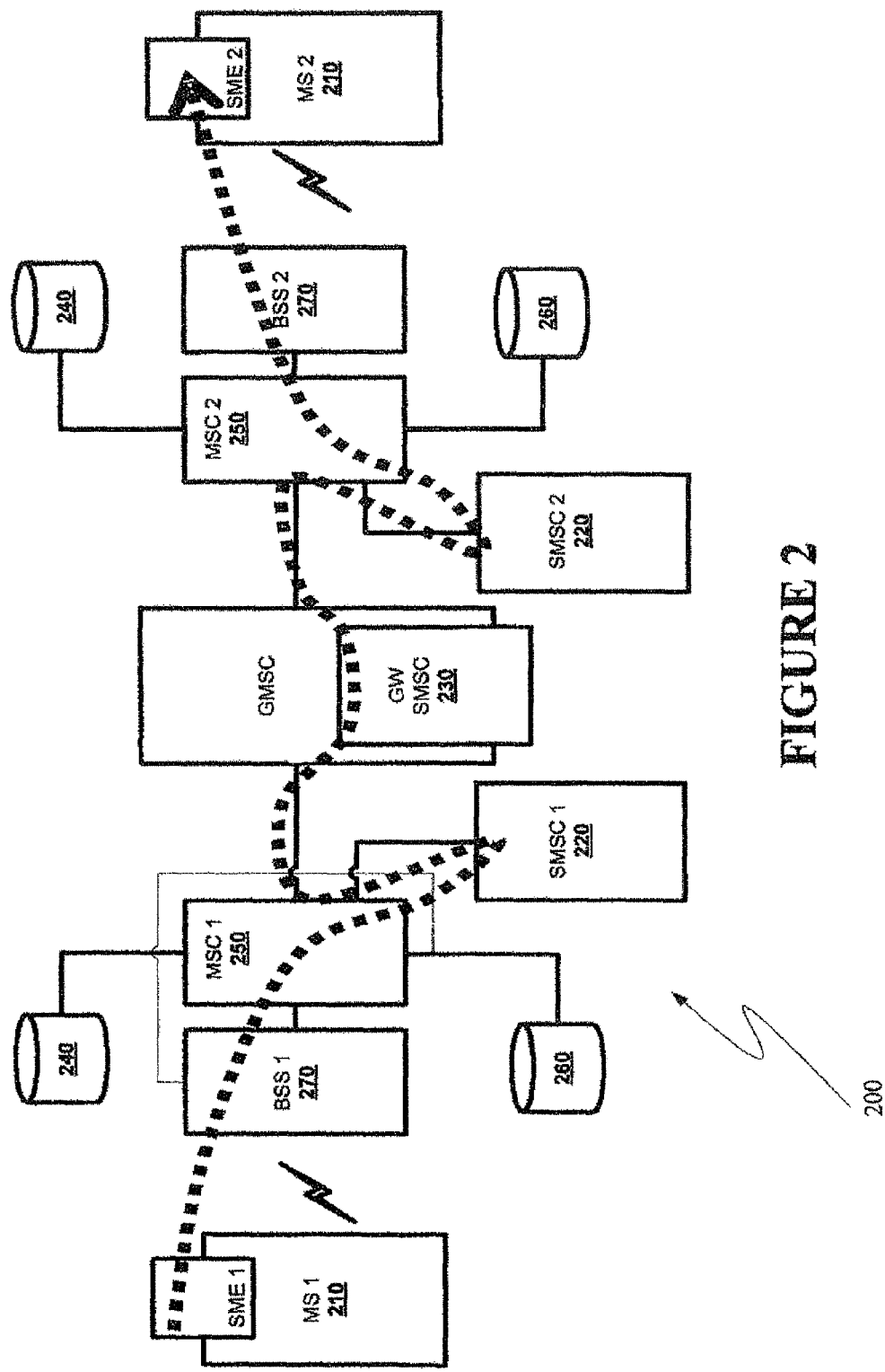
FIG. 2 shows a system of sending SMS from one communication device to the other communication device.

FIG. 2 shows a system 200 for sending SMS from one communication device to the other communication device. The system includes a mobile station 210 comprising of short message entities (SME), a short message service center (SMSC) 220, a gateway short message service center (GW SMSC) 230, a home location register (HLR) 240, a mobile switching center (MSC) 250, a visiting location register (VLR) 260 and a base station subsystem (BSS) 270. The short message entity has the capability of sending the drafted messages from the mobile device to the SMSC. These messages are sent over the air using out-of-band signaling channel. The SMSC is capable of storing and forwarding the message to and from the mobile station. One of the functions of SMSC is to bill for each message sent from the subscriber. The SMSC includes software which automatically bills according to each message passed through it or received at the SMSC from the user or subscriber.

Further, the SMSC forwards the short message to the GW SMSC, where the GW SMSC is a mobile network's point of contact with other networks; a GM SMSC converts protocol message type pertaining to one SMSC to another protocol message type pertaining to another SMSC. On receiving, the short message from the SMSC 1, GW SMSC uses the SS7 network to interrogate the current position of the mobile station with the help of the home location register (HLR). HLR is the one which maintain the database in a mobile network of the subscribers, where it holds information of the subscription profile of the mobile and also about the routing information for the subscriber, i.e. the area covered by a MSC, where the mobile is currently situated. After identifying the serving MSC, the duty of the GW SMSC is to pass on the message to the transmitting SMSC. The MSC is the entity in a GSM network which does the job of switching connections between mobile stations or between mobile stations and the fixed network. The MSC extracts information from the visiting location register (VLR), in case the MS is not present in its home location area, to switch the message to the serving BSS. The VLR which is located in one particular MSC contains the temporary information of the visiting MS. The information may be for example a mobile identification number and the particular cell or cells where the MS is presently residing in. The BSS includes a combination of the Base Station (BS) and the Base Station Transceiver (BTS). The BS provides the radio coverage for that particular cell and the BTS transmits and receives signals over the air interface. The BSS transmits the message to the intended MS. This information is passed over the signaling channels so the mobile can receive messages even if a voice or data call is going on. The signaling channels are ones which are used to send request for call set up with recipient number.

Figure 3:
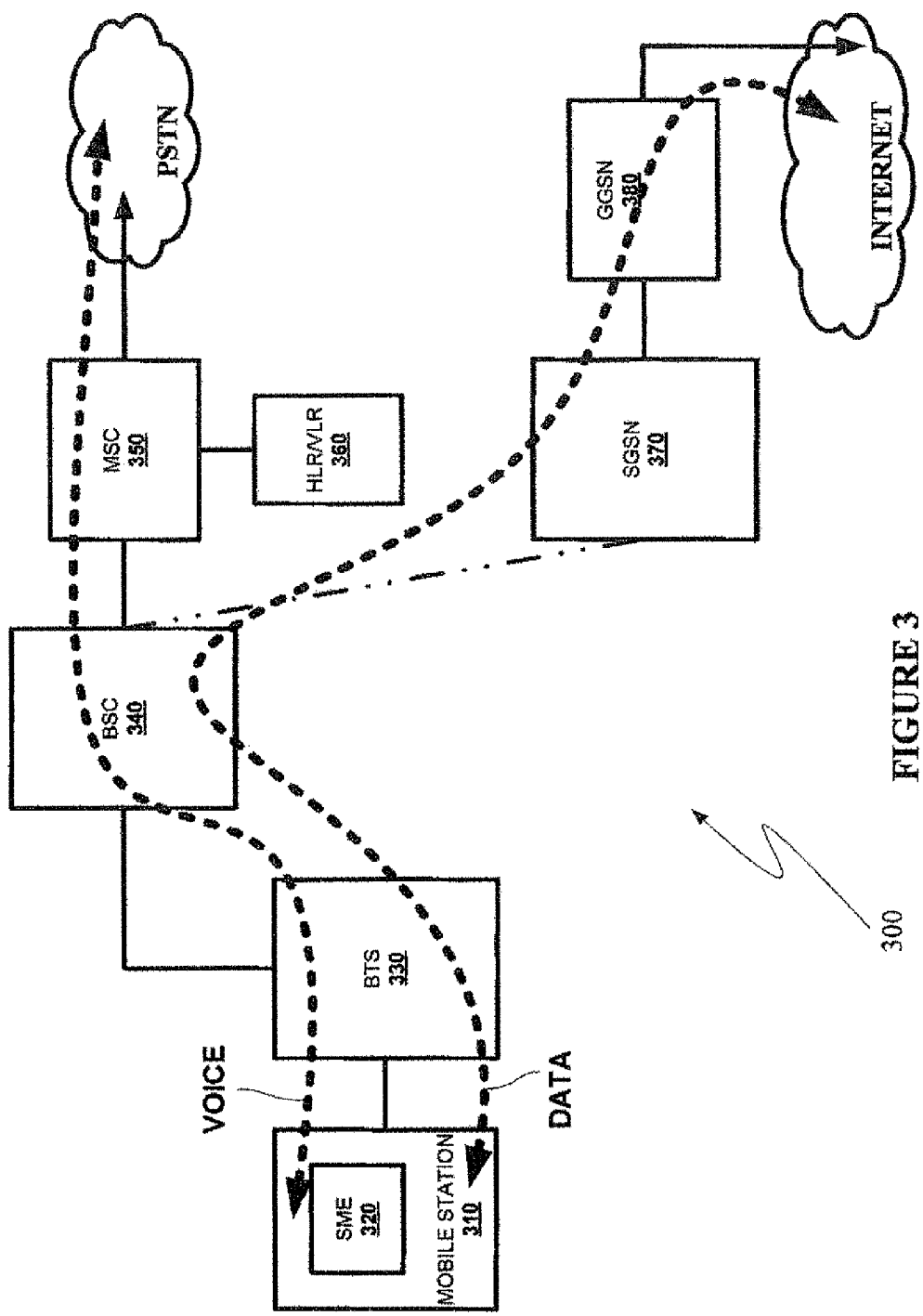
FIG. 3 shows a system of sending data or voice call from one communication device to the other communication device.

FIG. 3 shows a System of sending data or voice call from one communication device to the other communication device. The system 300 includes a mobile station 310 including a short message entity (SME) 320, a Base Transceiver Station (BTS) 330, one or more Base Station Controller (BSC) 340, a Mobile Switching Center (MSC) 350, a HLR/VLR 360, a Serving GPRS Support Node (SGSN) 370 and a Gateway GPRS Support Node (GGSN) 380.

The mobile station 310 (also called as user equipment (UE)) may be or may include a mobile phone (handsets), WLL phones, computers with wireless interact connectivity, Wi-Fi and Wi-MAX gadgets, etc. The short message entity 320 is a network entity (mobile/cell phone) which may be capable of sending and/or receiving messages. The BTS 330 is equipment which facilitates wireless communication between Mobile Station and a network. The network can be that of any of the wireless communication technologies like GSM, CDMA, WLL, WAN, Wi-Fi, Wi-MAX etc.

The base station controller (BSC) 340 provides, classically, the intelligence behind the BTSs. The BSC 340 handles allocation of radio channels, receives measurements from the mobile phones, and controls handovers from BTS to BTS. The mobile switching center (MSC) 350 is the primary service delivery node for GSM/CDMA, responsible for routing voice calls and SMS as well as other services (such as conference calls, FAX and circuit switched data). The MSC 350 also sets up and releases the end-to-end connection, handles mobility and hand-over requirements during the call and takes care of charging.

The home location register (HLR) 360 is a central database that contains details of each mobile phone subscriber that is authorized to use the GSM core network. There can be several logical, and physical, HLRs per public land mobile network (PLMN), though one international mobile subscriber identity (IMSI)/MSISDN pair can be associated with only one logical HLR (which can span several physical nodes) at a time. Also, the HLRs store details of every SIM card issued by the mobile phone operator. Each SIM has a unique identifier called an IMSI which is the primary key to each HLR record.

The Visitor Location Register (VLR) 360 is also a database of the subscribers who have roamed into the jurisdiction of the MSC (Mobile Switching Center) 350 which it serves. Each base station in the network is served by exactly one VLR; hence a subscriber cannot be present in more than one VLR at a time. The data stored in the VLR has either been received from the HLR, or collected from the MS 310 (Mobile station).

The Serving GPRS Support Node (SGSN) 370 which is responsible for the delivery of data packets from and to the mobile stations within its geographical service area. The Gateway GPRS Support Node (GGSN) 380 which is responsible for the interworking between the GPRS network and external packet switched networks, like the Internet, X25, WiMax networks, Frame Relay, etc.

The system of FIG. 3 which support internet (higher data rate) as compared to system of FIG. 2 which supports only data services (e.g. SMS).

Figure 4:
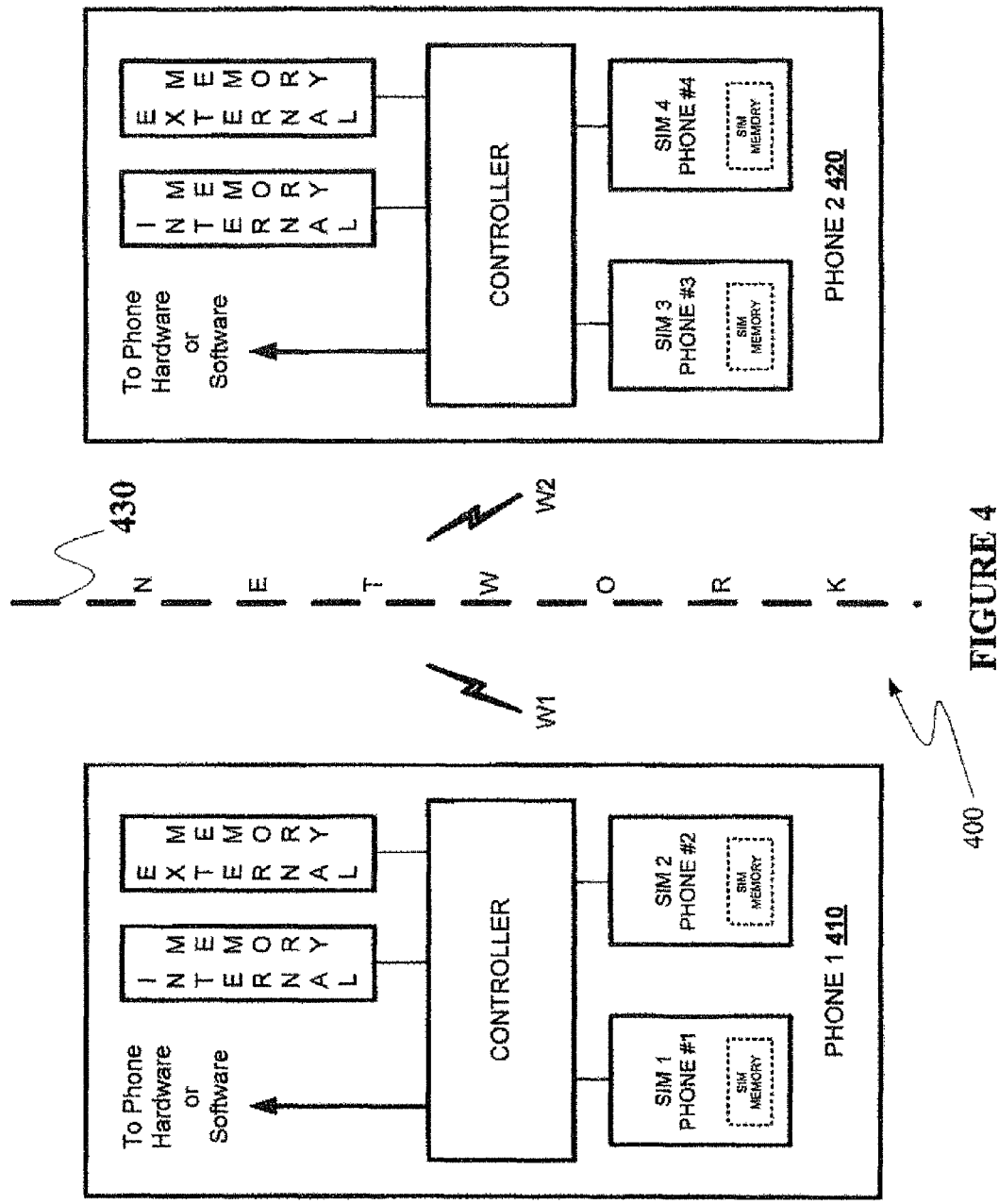
FIG. 4 illustrates a system for exchanging content between at least two communication entities according to one embodiment of the present invention.

FIG. 4 illustrates a system for exchanging content between at least two communication entities according to one embodiment of the present invention. Accordingly, the system 400 includes a first entity 410, a second entity 420 and a communication network 430. Preferably, the system 400 is compatible with presently known third generation (3G) wireless systems and corresponding standards. Alternatively, the system 400 may also be compatible with future high-speed (wireline or wireless) systems and corresponding standards (e.g., fixed or mobile).

According to various aspects, the first entity 410, and/or the second entity 420 may be or may include, for example, a telephone, a mobile phone, a cellular phone, a handheld device, a computing device, a computer, a mobile computer, a portable computer, a laptop computer, a notebook computer, a tablet computer, a network of multiple inter-connected devices, a handheld computer, a handheld device, a PDA device, a handheld PDA device, a vehicular device, a non-vehicular device, a mobile or portable device, or the like. According to some aspects, the first entity 410, and/or the second entity 420, may comprise a communication device connectable to one of the other devices/network via a wired connection.

The first and second entity 410 and 420 uses the communication networks 430 for communication through an antenna (not shown) via wireless links W1 and W2. For example, the network 430 may be or may include, for example, a PSTN, a wired or wireless muter, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area. Network (PAN), a Wireless PAN (WAN), One way and/or two-way radio communication systems, cellular radiotelephone communication systems, or the like Types of WLAN and/or WMAN communication systems intended to be within the scope of the present invention.

In some demonstrative embodiments, the first and second entity may include one or more SIM Cards including a SIM memory, one or more Free SMS Controller, one or more memory (internal, external etc) etc. In an example embodiment, the first entity and the second entity exchange content through a wireless or wired channel. The Free SMS Controller (as shown in FIG. 4) may be software or hardware when integrated with existing communication device will enable users to send and receive messages freely, wirelessly or over wires (copper, fiber, etc.). The first entity may have one or more SIM cards (e.g. SIM 1 and SIM 2 with phone numbers 1 and 2 belonging to first entity) and the second entity may have one or more SIM Cards (SIM 3 and SIM 4 with phone numbers 3 and 4 belonging to second entity).

Here in the present operational example, considering first entity is sender or caller or calling party and where second entity is a receiver or recipient or receiving party. The Free SMS Controller is capable of using either SIM1 or SIM 2 or both to make calls or missed calls. At the receiving end also the Free SMS Controller is capable of saving received calls or missed calls as bit '0' or bit '1' in internal phone memory or external phone memory or SIM memory. Further, the Free SMS Controller is also capable of reading saved contents from internal phone memory or external phone memory or SIM memory. Also, the Free SMS Controller is capable of designating at least one SIM as binary digit zero, bit '0', or as binary digit one, bit '1' for each saved content or messages.

By designating a particular SIM as bit '0' or bit '1' means that phone number associated with that SIM is designated as bit '0' or bit '1'. The Free SMS Controller is also capable of negotiating or pre-encoding a SIM or phone number as bit '0' or bit '1'. It is also possible, at a default condition, the Free SMS Controller may use numerically smaller phone number as bit '0' and higher phone number as bit '1'. In an alternate embodiment, when only one SIM is present, duration of deliberately terminated call will act as bit '0' and bit '1' depending on the duration thresholds.

Forms of the content may be or may include at least one but not limited to text, image, voice, video, etc. which may be saved in digital format by a user in the memory. Here in the present example, we consider the content is in the form of text message for the explanation of working of the system.

A text message in digital format is saved in any of the pre-designated memory (SIM memory, internal memory or external memory) by the user. The saved content is never sent as SMS by any of the communication device. Once the message is saved, the Free SMS Controller checks for a trigger command along with the text message or any other useful encoding that can be designated as a start character. The trigger command may include any symbol not limited to object, picture, or any particular mark that represents something by association, resemblance, or convention. The start character is used by the user to indicate that the processing of the message is to be handled by the Free SMS Controller. The Free SMS Controller, upon identifying the trigger command with the saved content, identifies one or more second entity with which the content has to be exchanged and enables a handshake message from the first entity to the second entity for ensuring about the appropriate decoding block with the second entity. The handshake message may be configured as sequence of 01010101 or an equivalent ASCII character. The handshake message is used to enable the recipient's Free SMS Controller to confirm whether to handle call or missed call processing. The recipient is identified by "name" in phonebook or his associated two phone numbers or any other unique means that enables unique identification of the recipient's one or more (two in the present example) phone numbers. Upon receipt of handshake message the recipient sends an acknowledgement message notifying the sender that it has a compatibility of handling SMS sent by the Free SMS Controller and is ready to receive call or missed call. Upon receipt of acknowledgement the Free SMS Controller sends saved message bit by bit (i.e. one bit at a time) or group of bits (i.e. symbol). A bit is sent by Free SMS Controller as a missed call to the recipient i.e. converting, the saved content of the first entity into symbols, where the converted symbols are sent as deliberately terminated call/s through a permissible unique identifier to the second entity.

A bit '0' is sent by giving missed call-via SIM 1 or phone number 1 and a bit '1' is sent by giving missed call via SIM 2 or phone number 2. Upon receipt of missed calls the recipient's Free SMS Controller will save the corresponding bits or symbols in the message inbox to recreate the complete text message. The received calls i.e. one or more intervals of the duration of the call of the deliberately terminated calls (one SIM) or the unique numbers (more than one SIM) are translated into unique symbols at the second entity to form a message. The sending Free SMS Controller may indicate end-of-message by sending a bye-bye character which can be uniquely identified as termination signal (e.g. the bye-bye character could be: !#). It is also possible that, if the termination signal is part of message that is being sent, then Free SMS Controller may repeat the previous character, if any, to indicate the recipient that next character is not bye-bye character. Upon receipt of termination character or bye-bye character the recipient Free SMS Controller will trigger display notification of new message or new SMS received on the phone screen or display at the second entity. Upon successful sending of message the sending Free SMS Controller may trigger display of message sent notification on the phone screen or display and move the content from memory to the folder called sent message.

The Free SMS Controller has the capability of handling of pre-encoded messages saved in the memory which can be used for faster communication. For example, if the encoding number 1=Hello; encoding number 2=How are you?; Encoding number 3=Where are you?. It is also possible that encoding is identified by special character, say @. Example: @1=Hello. @2=How are you? @3=Where are you? or any other combination thereof. At the receiver the Free SMS Controller has the capability of decoding the encoded number and further saving the same in the memory. The free SMS Controller has the capability of concatenating encoding number can also be sent. For example: @1@2 will decode to "Hello. How are you?". Further it is also possible that the encoding message number can also be interleaved within the usual or un-encoded Free SMS Controller messages. For example: Hello.@2Where are you? will decode to "Hello. How are you? Where are you?". There may be no space before and after encoding number for example the encoded message saved in the content will look like $!@1.

The Free SMS Controller is capable of using single SIM to send bit 0 and bit 1 by regulating the duration of missed calls; shorter duration for bit 0 (e.g. 3 seconds) and longer duration for bit 1 (e.g. 6 seconds) or it can be also possible the duration can be in milli seconds. The recipient Free SMS Controller is capable of learning the single SIM capability of the sender by listening to the duration of the missed calls from the same SIM or phone number. This capability may work better if call-set-up delay does not vary much over the duration of message. The Free SMS Controller is capable of using one, two or more SIMs to send and receive messages via missed calls. When Free SMS Controller uses more than two SIMs instead of bits, the Free SMS Controller may use symbols based on Galois Theory i.e. If phone 1 has three SIMs (SIM 1, SIM 2 and SIM 3) and phone 2 has three SIMs (SIM 4, SIM 5 and SIM 6) then missed call from SIM 1 Will represent symbol 1, missed call from SIM 2 will represent symbol 2 and missed call from SIM 3 will represent symbol 3. When two SIMs are used symbols and bits are same. The Free SMS Controller does not need to have identical number of SIMs on two communicating phones. In an example it is also possible that Phone 1 can have three SIMs whereas phone 2 can have two SIMs. Communication via three symbols is faster than communication via two symbols (or bits). So more the number of SIMs faster will be message transmitted. The communications between the first and second entity are in band (voice call) and/or out of band (signaling or control or management band) or any other future mode of sending the deliberate service termination (e.g. call, where the call may include a voice call/s, fax calls etc).

Example: Two SIM

Missed call from SIM 1=>symbol of value s1 or s1 for short representation

Missed call from SIM 2=>symbol of value s2 or s2 for short representation

Normally when we make use of only two values per symbol we call the digits as binary digits or bits.

A message is sequence of symbols. E.g. x1, x2, x3 . . . .

A byte is a sequence of eight binary digit symbols=>x1, x2, x3, x4, x5, x6, x7, x8

Each symbol, xi, can take value s1 or s2. symbol s1 is usually given name '0 bit' and represented as simply '0' and symbol s2 is usually given name '1 bit' and represented as simply '1'

If we assign value as follows, x1=x2=x3=x4=x5=x6=x7=x8=0, then the corresponding byte is 00000000. If we assign value as follows, x1=x3=x5=x7=0 and x2=x4=x6=x8=1, then the corresponding byte is 01010101 There are 2×2×2×2×2×2×2×2=256 different bytes possible.

In information theory or computer digital technology 0 and 1 are transmitted as voltages, current, frequency, etc.

Example, 0 bit=>0.75 Volt and 1 bit=>5 Volt

Example: Four SIM

Missed call from SIM 1=>symbol of value s1 or s1 for short representation

Missed call from SIM 2=>symbol of value s2 or s2 for short representation.

Missed call from SIM 3=>symbol of value s3 or s3 for short representation

Missed call from SIM 4=>symbol of value s4 or s4 for short representation

Just like binary digits or bits, there can be quaternary digits. A message is sequence of symbols. x1, x2, x3, . . . .

A byte can be represented with just 4 quaternary digits=>x1, x2, x3, x4.

Each symbol, xi, can take value s1, s2, s3 or s4.

symbol s1 is usually given name '0 bit' and represented as simply '0'.

symbol s2 is usually given name '1 bit' and represented as simply '1'.

symbol s3 is usually given name '2 bit' and represented as simply '1'.

symbol s4 is usually given name '3 bit' and represented as simply '3'.

There are 4×4×4×4=256 different bytes possible.

In information theory or computer digital technology 0, 1, 2 and 3 are transmitted as voltages, current, frequency, etc. Example, 0 quaternary digit=>0.75 Volt, 1 quaternary digit=>1.5 volt 2 quaternary digit=>3 volt, and 3 quaternary digit=>5 volt.

Notice that the information conveyed by two bits can be conveyed by just one quaternary digit. Example, '00' in bits can be conveyed by just s1 or 0 in quaternary digit. Note that '0' in binary digit is not same as quaternary digit They use completely different algebraic instance. Similarly, '01' in bits can be conveyed by just s2 or 1 in quaternary digit. '10' in bits can be conveyed by just s3 or 2 in quaternary digit. '11' in bits can be conveyed by just s4 or 3 in quaternary digit.

This is very analogous to hexadecimal digit and its representation 0, 1, 2, 3, 4, 5, 6, 7, 8, 9, A, B, C, D, E, and F, wherein a single symbol takes 16 values. Similarly, in case of decimal digit a single symbol can take 10 values 0, 1, 2, 3, 4, 5, 6, 7, 8 and 9.

Therefore when one uses more SIMs, with fewer missed calls one can convey more messages or faster message than fewer SIMs.

In an example consider a message "AFSAR" that is to be transmitted.

When "AFSAR" is encoded as 8 bit (UTF-8) equivalent of ASCII character we get:

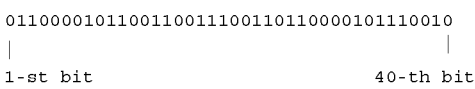

When two SIMs are used to transmit "AFSAR" with, missed calls it looks as follows:

1st bit=>missed call from SIM 1

2nd bit=>missed call from SIM 2

3rd bit=>missed call from SIM 2

4th bit trussed call from SIM 1

5th bit=>missed call from SIM 1 and so on . . .

When four SIMs are used "AFSAR" is represented as:

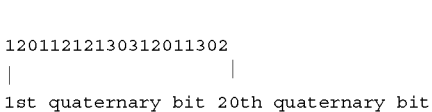

When missed call is transmitted it looks as follows:

1st quaternary bit=>missed call from SIM 2

2nd quat. bit=>missed call from SIM 3

3rd quat. bit=>missed call from SIM 1

4th quat. bit=>missed call from SIM 2

5th quat. bit=>missed call from SIM 2 and so on . . . .

The Free SMS Controller may be or may include software or hardware when integrated with existing communication device enables the users of this system to send and receive messages freely, wirelessly or over wires (copper, fiber, etc.).

Figure 5:
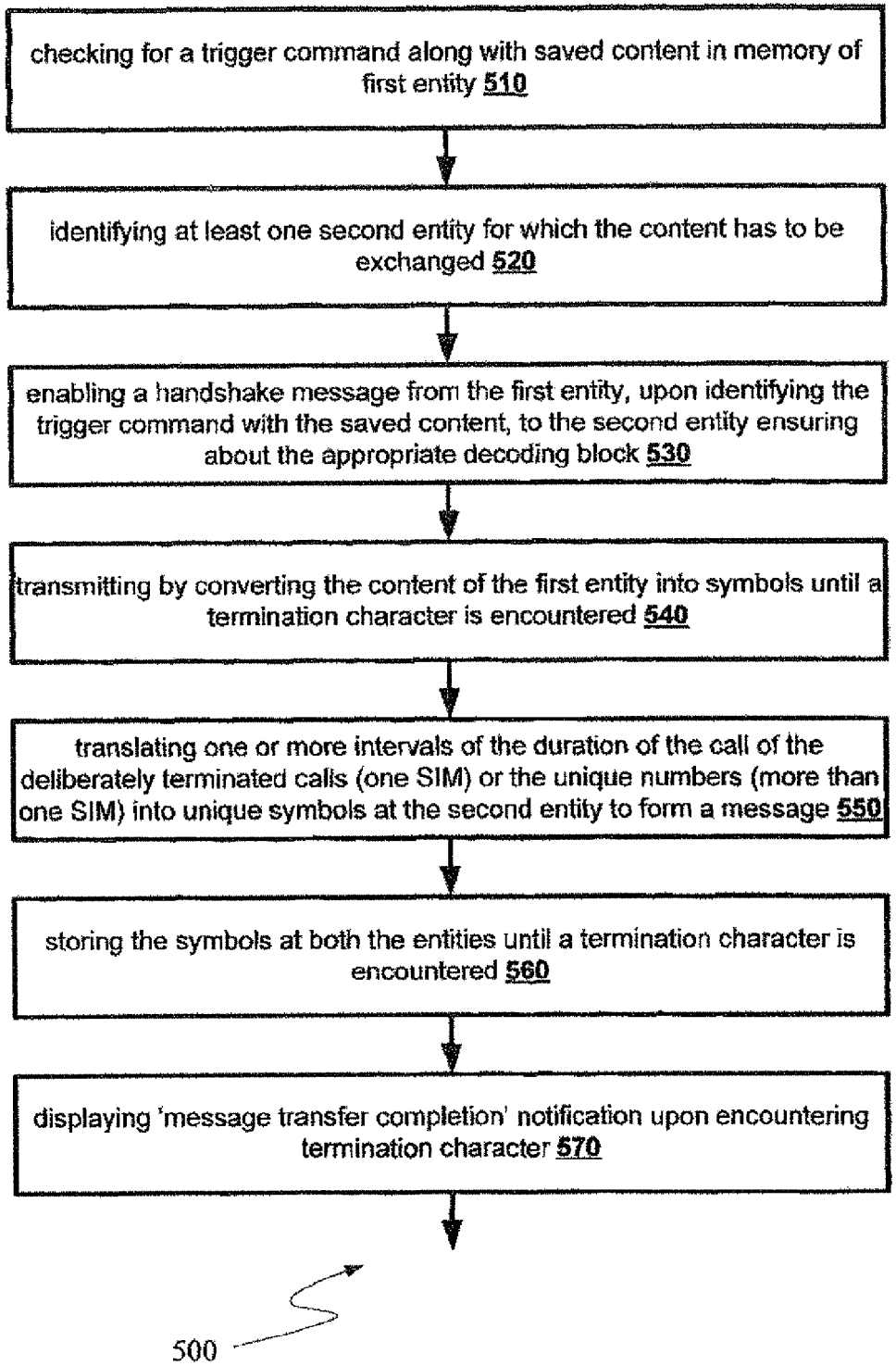
FIG. 5 shows a flow chart of a method of exchanging content between at least two communication entities according to one embodiment of the present invention.

FIG. 5 shows a flow chart of a method of exchanging content between at least two communication entities according to one embodiment of the present invention. At step 510, the method checks for a trigger command along with the saved content in a memory of the entity (e.g. saved draft, saved notes, in a mobile phone etc.). The trigger command may be or may include any symbol not limited to object, picture, or any particular mark that represents something by association, resemblance, or convention. The trigger command(s) is used by a user to indicate that the processing of the message is to be handled by the Free SMS Controller. In an alternate embodiment, the trigger may be an Explicit trigger (e.g. key or combination of key press on the keypad or touch screen or a command received in lieu of key press) may work as or replace the trigger command to indicate that the processing of the message is to be handled by the Free SMS Controller.

At step 520, the method identifies one or more second entity for which the content has to be exchanged (i.e. one or more second entity). The second entity may be a mobile phone, a computer or any other article which is capable of handling the process including a Free SMS Controller.

At step 530, the method enables a handshake message from the first entity to the other available second entity. Upon identifying the trigger command(s) including explicit trigger (e.g. key press) along with the saved content of the first entity, the Free SMS Controller checks for the compatibility of processing such content (ensuring about the appropriate decoding block) with the second entity.

At step 540, the method starts transmitting by converting the saved content of the first entity into symbols until a termination character is encountered, wherein the converted symbols are sent as deliberately terminated call/s through a permissible unique identifier to the second entity. Wherein the sent symbols are sent as modulating the duration of the call of the deliberately terminated calls through one permissible unique number in case there is only one SIM (or International Mobile Subscriber Identity (IMSI), etc.) or are sent as deliberately terminated calls from permissible unique numbers that corresponds to the symbols i.e. more than one SIM (e.g. set of SIMs, set of IMSIs, etc.).

At step 550, the method translates one or more intervals of the duration of the call of the deliberately terminated calls (one SIM) or the unique numbers (more than one SIM) into unique symbols at the second entity to form a message.

At step 560, the method stores all the symbols in the content at both the entities until a termination character is encountered. The termination character(s) may be or may include a bye-bye character which can be uniquely identified as termination signal (e.g. the bye-bye character could be: !#). It is also possible that, if the termination character(s) is part of message that is being sent, then Free SMS Controller may repeat the termination character, if any, to indicate the recipient that the character is not bye-bye character. In other words, the method is resilient to false termination characters, i.e. the termination characters that forms part of content, on the transmitter/sender side.

At step 570, upon encountering termination character or bye-bye character or non-duplicate bye-bye character, i.e. when the transfer of content is completed., the Free SMS Controller will trigger display of notification of completion of transfer (e.g. 'message sent notification' on the phone screen or display at the first entity and new message or new SMS received on the phone screen or display at the second entity). The receiver side is also resilient to false termination characters, i.e. the termination characters that forms part of content.

Although the method flowchart includes steps 510-570 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit Thus, the exemplary process flow diagrams are applicable to software, firmware, and/or hardware implementations.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art. For example, those of ordinary skill in the art may implement different method to handle occurrence of termination characters within the content than that mentioned in FIG. 5.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own, as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

What is claimed is:

1. A method of exchanging content among at least two communication entities over a communication network, the method comprising:

checking for a trigger command along with a single message stored in a memory of a first entity;

identifying a second entity with which the single message has to be exchanged;

enabling a handshake message from the first entity, upon identifying the trigger command, to the second entity, the handshake message providing the second entity with a type of decoding for receiving the single message from the first entity;

converting the single message of the first entity into symbols until a termination character is encountered, the symbols including the termination character;

transmitting the converted symbols associated with the single message to the second entity as a sequence of deliberately terminated calls through at least two subscriber identity modules (SIMs) in the first entity, wherein each SIM of the at least two SIMs in the first entity is associated with a permissible unique identifier, and wherein each SIM transmits different converted symbols associated with the single message to the second entity; and translating the sequence of the deliberately terminated calls received on the second entity into unique symbols, the unique symbols forming the single message at the second entity, wherein each deliberately terminated call is translated into a respective unique symbol according to the permissible unique identifier associated with each of the at least two SIMs in the first entity.

2. The method of claim 1 further comprising:
storing the symbols at both the entities until the termination character is encountered.

3. The method of claim 1, further comprising:
displaying a message transmission notification on the first entity once the termination character is encountered.

4. The method of claim 3, further comprising:
displaying a message receipt notification on the first entity once transmission is acknowledged.

5. The method of claim 1, further comprising:
displaying a message receipt notification on the second entity once the second entity receives the termination Character from the first entity.

6. The method of claim 1, further comprising:
storing the single message at the first entity which is transmitted to the second entity, and at the second entity which is received from the first entity.

7. The method of claim 1, wherein the trigger command includes at least one of a symbol, a portion of text, an object, or a picture.

8. A system of exchanging content between at least two communication devices, the system comprising:
at least one communication network;
a plurality of subscriber identity modules (SIMs), each SIM associated with a permissible unique identifier; and
a first and a second communication devices, the first and second communication devices being coupled to each other via the at least one communication network, a first subset of SIMs being inserted in the first communication device, a second subset of SIMs being inserted in the second communication device, each of the first and second communication devices including a memory and a free Short Message Service (SMS) controller associated with the respective subset of permissible unique identifiers, wherein the free SMS controller of the first communication device is configured to:
check for a trigger command along with a single message stored in the memory of the first communication device,
identify the second communication device as an entity for which the single message has to be exchanged,
enable a handshake message from the first communication device, upon identifying the trigger command along with the single message, to the second communication device, the handshake message providing the second communication device with an indication of a type of decoding for receiving the single message from the first communication device,
convert the single message of the first communication device into symbols until a termination character is encountered, the symbols including the termination character, and
transmit the converted symbols associated with the single message to the second communication device as a sequence of deliberately terminated calls through at least two SIMs in the first communication device, and wherein each SIM transmits different converted symbols associated with the single message to the second communication device, and
wherein the free SMS controller of the second communication device is configured to:
translate the sequence of the deliberately terminated calls received on the second communication device into unique symbols, the unique symbols forming the single message at the second communication device, wherein each deliberately terminated call is translated into a respective unique symbol according to the permissible unique identifiers associated with the at least two SIMs in the first communication device.

9. The method of claim 1, wherein each permissible unique identifier includes a phone number or an International Mobile Subscriber Identity (IMSI).

10. The method of claim 1, wherein the respective unique symbols are non-binary symbols.

11. The method of claim 1. wherein the respective unique symbols are binary symbols.

12. The system of claim 8, wherein the free SMS controller of the second communication device is configured to receive the sequence of the deliberately terminated calls through at least one SIM of the second subset of SIMs in the second communication device.

* * * * *